Dec. 14, 1965  G. RAVAL  3,222,860

RESERVE POWER INDICATING SYSTEM IN A TIMEPIECE

Filed June 15, 1964

INVENTOR
Gaston Raval
BY
ATTORNEY

United States Patent Office 3,222,860
Patented Dec. 14, 1965

3,222,860
RESERVE POWER INDICATING SYSTEM
IN A TIMEPIECE
Gaston Raval, La Neuveville, Switzerland, assignor to Omega Louis Brandt & Frere S.A., Bienne, Switzerland
Filed June 15, 1964, Ser. No. 375,104
Claims priority, application Switzerland, July 20, 1963, 9,021/63
5 Claims. (Cl. 58—152)

This invention relates to a reserve power indicating system in a timepiece having a balance wheel, particularly in an electric or electronic timepiece. Relatively complicated systems are known for continuously indicating the available reserve power of the spring in mechanical timepieces. However, it is impossible to use indicators of this type in electric or electronic timepieces wherein the energy source is a battery or accumulator. Moreover, it is not necessary that the owner of an electric or electronic watch exactly knows the real value of the reserve power but it is sufficient to know whether with the available power proper operation of the timepiece is warranted or not, in order that the power source may be replaced as soon as this condition is no longer fullfilled.

This invention is based on the idea of indirect reading of the reserve power by observing the operating characteristics of the timepiece and more particularly by providing means allowing continuous observation and measurement of the amplitude of the balance wheel of the timepiece. However, it is difficult to indicate accurate values of the balance-wheel amplitude for all conditions of the power source during its discharge. It was now found to be sufficient to determine whether the amplitude of the balance wheel still has the necessary minimum or limit amplitude at which proper operation of the timepiece is warranted. This invention is broadly characterized by indicating means operable as long as the balance wheel amplitude exceeds a predetermined limit value and inoperative when the balance wheel amplitude decreases below the said value. The said predetermined value of the balance wheel amplitude will be chosen within the range of balance wheel amplitudes for which proper operation of the timepiece is warranted. While it is difficult or even impossible to exactly determine the real amplitude of the balance wheel with simple means, it is relatively simple to indicate whether the amplitude of the balance wheele is above or below a predetermined value.

In the attached drawing one embodiment of the invention is schematically illustrated by way of example.

Figure 1:
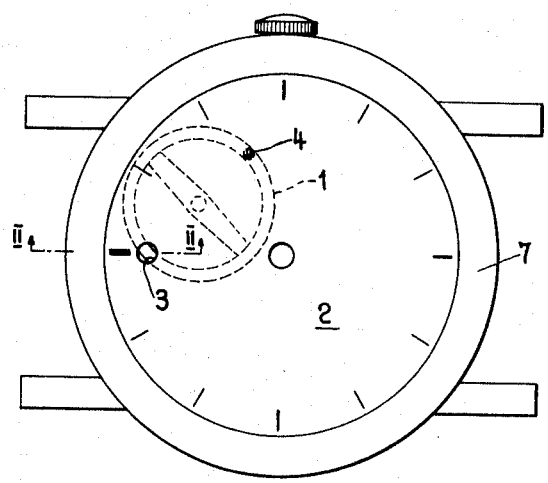
FIG. 1 is a top view of a watch equipped with the invention.
Figure 2:
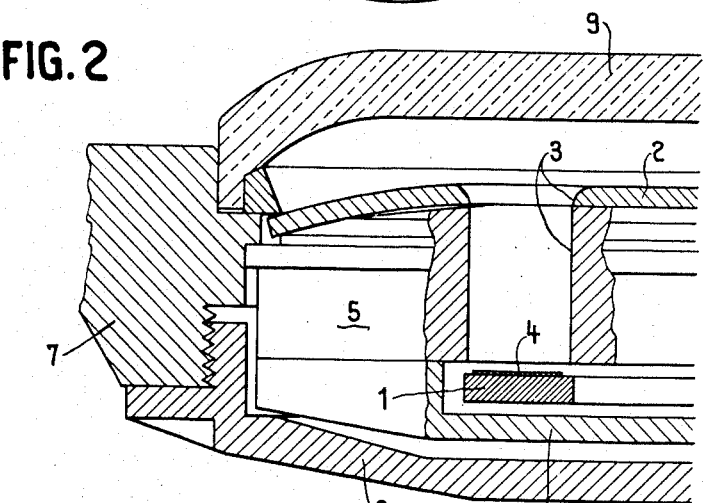
FIG. 2 is a partial section along line II—II in FIG. 1.

The position of the balance wheel 1 of the timepiece below the dial 2 of the watch is shown in FIG. 1. The dial 2 and the plate 5 located between the balance wheel and the dial have a common window 3 through which the rim of the balance wheel is visible. A coloured mark 4 is provided on the rim of the balance wheel which is shown in its neutral rest position. In this position of the balance wheel the mark 4 is diametrally opposite the window 3 with reference to the axis of the balance wheel. The other parts of the watch such as a bridge 6 carrying the lower bearing (not shown) of the balance wheel, the case band 7, the back 8 and the crystal 9 need no further explanation because these parts are conventional and in no closer relation with the invention.

It is assumed that the oscillation of the balance wheel 1 is sustained by an electro-dynamic or electro-magnetic system energized from a battery and controlled by a contact or by electronic means such as a transistor in a manner well known per se. The normal amplitude of the balance wheel is in the order of 200°.

With this amplitude exceeding 180° the mark 4 will pass below the window 3 four times per full cycle of the balance-wheel oscillation. When the amplitude of the balance wheel decreases to 180° due to voltage drop of the power source, the mark 4 will still appear in the window 3 twice per full cycle of the oscillation. However, when the amplitude falls below 180° the mark 4 will no longer appear in the window 3 and this shows to the owner of the watch that the power source will soon be completely discharged and cannot longer warrant proper operation of the timepiece. The owner thus knows that the power source has to be recharged or replaced according to the type of cell used in the watch.

Figure 3:
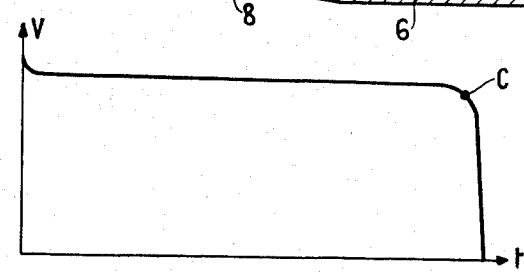
FIG. 3 illustrates the discharge diagram of a power source.

It is well known that mercury oxide cells have a relatively flat discharging characteristic as shown in FIG. 3 for a long time, whereafter the characteristic rapidly falls off towards the end of the lifetime of the cell. When the circuits of the timepiece are so adjusted that the amplitude of the balance wheel falls to 180° when the power source operates in the center C of the curvature at the end of its characteristic, a reserve power in the order of 4 weeks is still available during which the timepiece will properly operate and during which the power source may be replaced or recharged.

Of course the invention may be used with any other type of primary or secondary cell. In order to obtain a clear indication of the limit amplitude of 180° the dimensions of the mark 4 and of the window 3 in circumferential direction of the balance-wheel rim should be relatively small compared with the said predetermined limit amplitude of the balance wheel. When the limit amplitude is below 180° the circumferential dimensions of the mark 4 and/or the window 3 may be increased. Any other than circular shape may be used for the window 3 and the mark 4. As an example a window 3 of rectangular or square shape and a mark 4 of similar shape may be used.

In the embodiment shown in the drawings the window 3 may be considered to form a fixed reference mark cooperating with the displaceable mark 4. Another fixed reference mark, for instance an arrow or the like may be provided which is visible through a window of larger circumferential size or which is located on top of the dial. Such a reference mark may be adjustable for reading different limit amplitudes. For limit amplitudes below 180° two windows may be provided in alignment with the end positions reached by the mark 4 at limit amplitude.

What I claim is:

1. A reserve power indicating system in a timepiece having a balance wheel, particularly in an electric or electronic timepiece, said balance wheel having a lower limit amplitude at which proper operation of the timepiece is warranted and a nominal amplitude exceeding said limit amplitude, a mark on said balance wheel and at least one reference mark on a stationary portion of the timepiece, window means allowing observation of said balance wheel, said mark and reference mark having a size in circumferential direction of the balance wheel which is small compared with the said limit amplitude and nominal amplitude of the balance wheel, said mark and reference mark coinciding when the balance wheel is in the reversal point of its oscillation at said limit amplitude.

2. A reserve power indicating system in a timepiece having a balance wheel, particularly in an electric or electronic timepiece, said balance wheel having a lower limit amplitude at which proper operation of the timepiece is warranted and a nominal amplitude exceeding said limit amplitude, a mark on said balance wheel and a window allowing observation of a portion of the balance wheel, said window and mark having an angular extension small as compared with the said limit amplitude and nominal amplitude, said mark being in said window when the balance wheel is in the reversal point of its oscillation at said limit amplitude.

3. A reserve power indicating system according to claim 2, wherein said limit amplitude is 180° and the mark of the balance wheel and the window are located in places diametrally opposite with reference to the axis of the balance wheel when the balance wheel is in its neutral position.

4. A reserve power indicating system in a timepiece having a balance wheel, particularly in an electric or electronic timepiece, said balance wheel having a lower limit amplitude at which proper operation of the timepiece is still warranted and a nominal amplitude exceeding said limit amplitude, a visible mark on said balance wheel swinging through a predetermined angular portion of a circular path at said limit amplitude, window means for observation of a portion of said balance wheel including said angular path of the mark, said mark appearing in said window when the balance wheel is in the reversal point of its oscillation at said limit amplitude, but the mark does no longer appear in the window for amplitudes below said limit amplitude.

5. A reserve power indicating system in a timepiece having a balance wheel, particularly in an electric or electronic timepiece, said balance wheel having a lower limit amplitude at which proper operation of the timepiece is still warranted and a nominal amplitude exceeding said limit amplitude, window means for observation of said balance wheel, a reference on said balance wheel and a reference on a stationary portion of the timepiece, said references visibly coinciding when the balance wheel is in the reversal point of its oscillation at limit amplitude.

References Cited by the Examiner
UNITED STATES PATENTS
1,461,671   7/1923   Page _____ 116—124

FOREIGN PATENTS
995,352   11/1951   France.
36,829   7/1906   Switzerland.
360,345   3/1962   Switzerland.

OTHER REFERENCES
Hope-Jones, F.: Electric Clocks, NAG Press Ltd., London, 1931 TS 544 H 6, Chapter XX, "Battery Warning . . .," pp. 151–158.

LEO SMILOW, *Primary Examiner.*